Patented Mar. 2, 1943

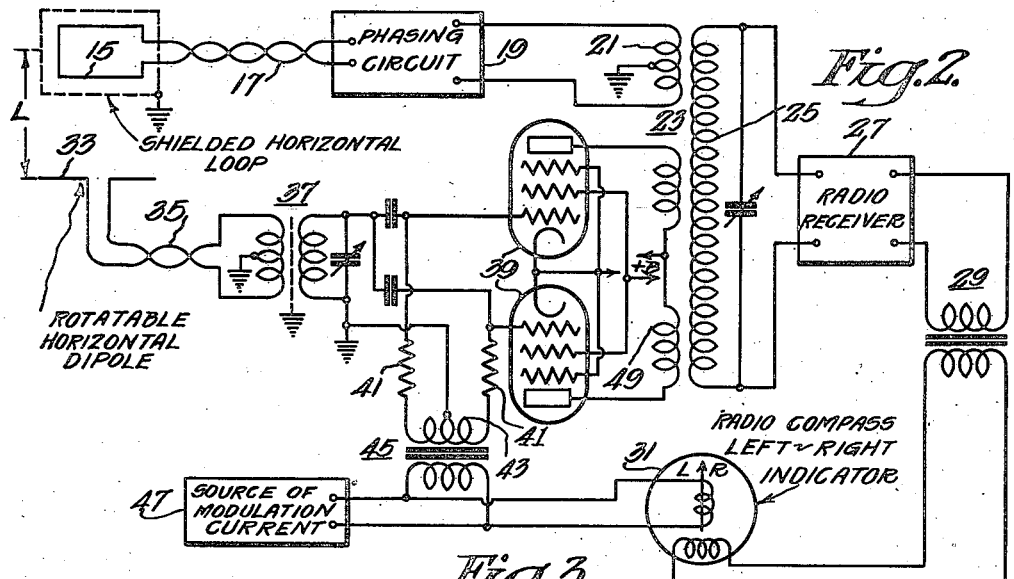

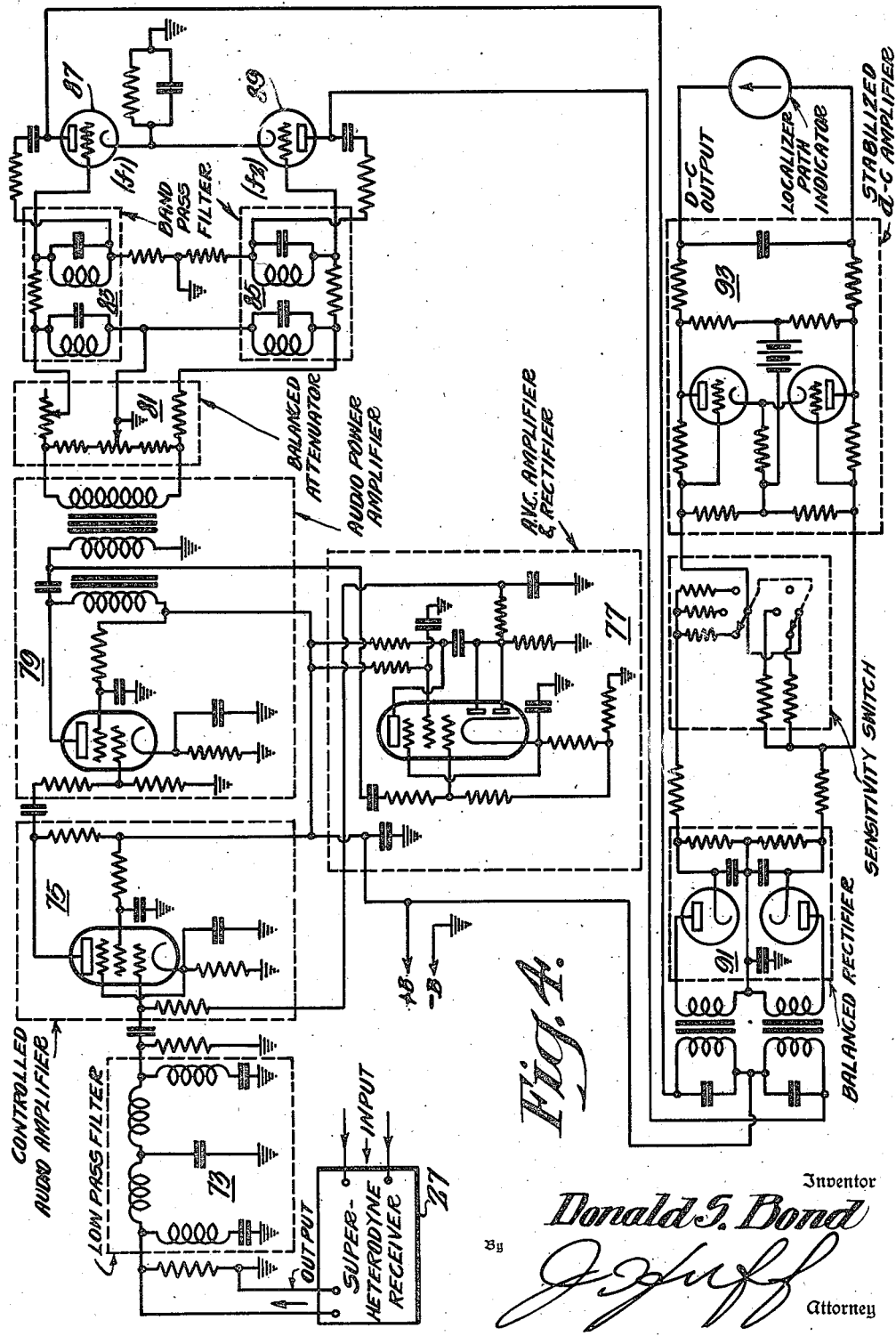

2,312,747

UNITED STATES PATENT OFFICE 2,312,747

RADIO NAVIGATION SYSTEM

Donald S. Bond, Philadelphia, Pa., assignor to Radio Corporation of America, a corporation of Delaware Application April 12, 1939, Serial No. 267,493

5 Claims. (Cl. 250—11)

This invention relates to radio navigation systems and more particularly to an instrument landing system for aircraft.

The problem of landing an aircraft on a runway which is invisible to the pilot involves informing the pilot of the location of the craft with respect to the runway. Such information should include the following:

(1) The altitude of the aircraft with respect to the runway; (2) the position of the craft with respect to the vertical plane through the longitudinal axis of the runway; (3) the heading and course of the craft with respect to said vertical plane, and (4) the location of the craft with respect to the vertical projection of the end of the runway.

While various means have been proposed and used for obtaining the required information the devices have been complicated. Furthermore, the apparatus has been heavy and cumbersome, and the accuracy not as great as is required. The present invention combines several functions in a simplified receiving device for an instrument landing system, and increases the accuracy of indication.

Among the objects of the invention are the provision of means for conveying radio navigational information to the pilot of an aircraft. Another object is to provide simplified, light weight, compact apparatus for aircraft for instrument landings. A further object is to provide means for indicating to the pilot of an aircraft a glide path, a runway course, and the heading or course of the craft with respect to a point at the far end of the runway.

Figure 5:
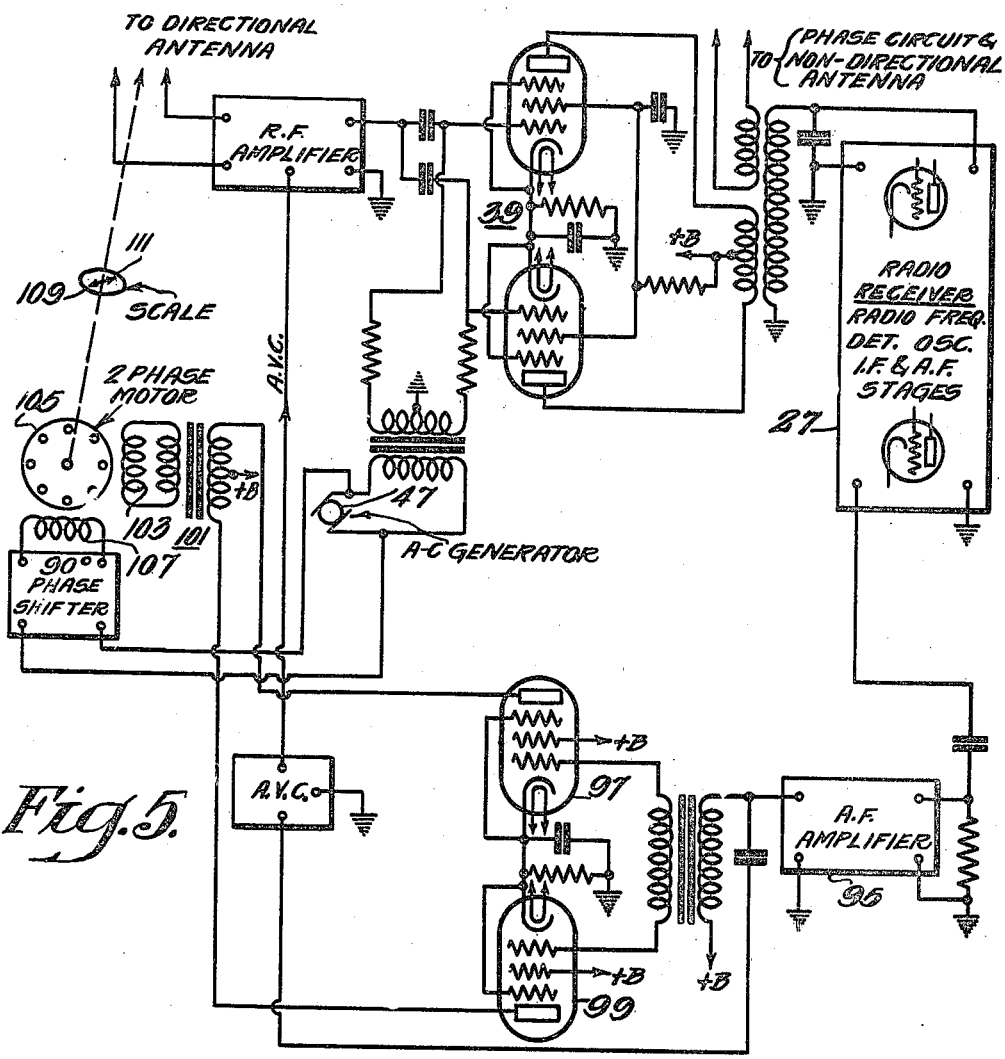
Figure 6:
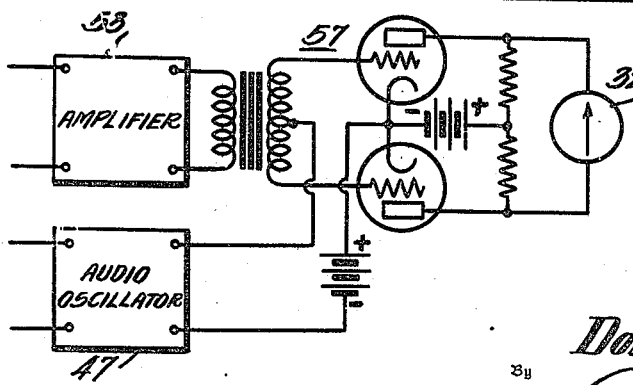

The invention will be described by reference to the accompanying drawings in which Figs. 1a and 1b are illustrations used in describing an aircraft landing system; Fig. 2 is a schematic circuit diagram of an ultra high frequency radio compass; Fig. 3 is a schematic circuit diagram of one embodiment of the invention; Fig. 4 is a schematic circuit diagram of the localizer detector employed in the invention; Fig. 5 is a schematic diagram of a self-orienting radio compass employed in the invention; and Fig. 6 is a circuit diagram of a balanced modulator. In describing the several figures similar reference numerals will be used to indicate similar parts.

Referring to Fig. 1a, a radio transmitter 1, located at the far end of a runway, is used to establish horizontally polarized ultra high frequency fields 3, 5. The fields include distinctive modulations or signals. Along the axis of symmetry 6 in the center of the overlapping portion 7, the fields are of equal strength. The axis 6 and the zone of approximate equal field strength 7 form a localizer path which coincides with a vertical plane through the longitudinal axis of the runway.

An airplane 9, upon receiving the runway localizer signals, is flown along the equal signal path. In flying this path, the pilot or navigator cannot tell that the plane is not properly headed along the runway and toward its far end 1 until the plane has actually flown to or past the boundaries of the equal signal zone 7 as shown by the broken line 11. In other words, the plane is kept within the localizer course by a trial and error method.

If the pilot knows the angular relation between the runway and north, or other earth meridian, he can supplement the localizer information by employing a magnetic compass or directional gyro. However, it is found generally that neither the magnetic compass nor the gyro are sufficiently accurate to indicate clearly the desired course within the localizer path. If, in addition to the runway localizer information, information is obtained on the craft by means of a radio compass to indicate the radio transmitter at the end of the runway, the pilot may follow a course 13 shown in Fig. 1b; that is, the runway is indicated by both runway localizer signals and radio compass signals. The latter signals show changes instantaneously in the course or heading of the craft without waiting until the craft has reached a boundary. Furthermore, the radio compass may be made sufficiently accurate to overcome the inherent errors or limited precision of the earth compass or directional gyro indicators.

It should be understood that the altitude of the craft and its glide path are obtained by the reading of an altimeter, and by the interception of a glide path which may be a line of equal potential gradient established by the carrier radiation from the transmitter. It may alternatively be the equi-signal axis in a vertical plane of two overlapping lobes of signal directed upward at different angles. The location of the craft along the line 13 of Fig. 1b with respect to the end of the runway is shown by signals from one or more marker beacons in accordance with a practice known to those skilled in the art.

A suitable ultra high frequency radio compass circuit is shown in Fig. 2. A shielded horizontal loop 15 is connected through a transmission line 17 and phasing circuit 19 to the balanced primary 21 of a radio frequency transformer 23.

The secondary 25 of the transformer is connected to a radio receiver 27, which may include a superheterodyne or like circuit. The output 29 of the receiver is applied to a left-right radio compass indicator 31.

A rotatable dipole 33, preferably spaced from the loop 15 by a distance L substantially shorter than a wave length, is connected through a transmission line 35 and a radio frequency transformer 37 to the grids of a pair of keyer or modulation tubes 39. The grids are connected through series resistors 41 to the secondary 43 of a balanced transformer 45. The primary of the balanced transformer 45 is connected to a source 47 of modulation current. The outputs of the modulation tubes 39 are applied, through a balanced tertiary winding 49, to the radio frequency transformer 23. The modulation current source 47 is also connected to the indicator 31.

In the operation of the foregoing circuit, the response characteristic of the loop in the horizontal direction is uniform or circular. The response of the dipole is a figure of eight. The currents from the loop, after proper phasing, are combined with currents of alternatively opposite phases transmitted from the dipole through the keyer or modulation tubes. The effect of such combination is to establish two cardioid response patterns in a manner known to those skilled in the art. The phase of the receiver output current is compared with a current of local reference phase obtained from the source 47 of modulation currents. The resultant indication shows whether the responses from the alternate cardioid patterns are equal, or which of either response is greater. In this matter "on course," or "left or right of course" indications are obtained.

The above described circuit may be modified to incorporate means for indicating the glide path and the localizer or runway path as shown in Fig. 3. The radio compass portion of the system preferably includes a filter 51, an amplifier 53 including A. V. C. 55, and a balanced modulator 57. The filter 51 is arranged to pass currents of only the frequency of the modulation source 47 and reject currents of other frequencies such as may be employed in the glide path or localizer fields. The equipotential signals which establish the glide path are applied to the loop antenna and hence to the radio receiver 27. The output of the detector of the receiver is applied through a suitable filter 59 to a meter 61 which indicates the glide path.

The output of the receiver 27 is coupled to a localizer detector 63 which preferably includes an A. V. C. circuit 65. The localizer detector may include the circuit arrangements described in copending application Serial No. 258,907, filed February 28, 1939, by Donald S. Bond, entitled "Radio receivers," Patent No. 2,264,063 dated November 25, 1941. It should be understood that the localizer detector includes filters for selecting currents of the desired signal frequency and rejecting currents of the local modulation frequency or any other undesired frequencies.

The nature of the localizer detector is described by referring to Fig. 4. The received signals, after passing through the receiver 27 and the filter 73, are amplified by an amplifier 75 which has A. V. C. means 77. The output of the amplifier 75 is applied to a power amplifier 79, attenuator 81, band pass filters 83, 85 (which respectively select the frequencies $f1$ and $f2$) and hence through feedback amplifiers 87, 89 to a balanced rectifier 91. The output from the balanced rectifier, preferably after amplification in the amplifier 93, is applied to the localizer path indicator.

In the lower portion of the diagram of Fig. 3, the left-right radio compass indicator 32 is shown. It will be observed that in Fig. 2 the indicator 31 includes two coils and is operated by alternating current. In the present circuit, the alternating currents are applied to a balanced modulator 57, which may be connected to a meter 32 or a loop-orienting motor. If the orienting motor is used, the indicator may be a pointer directly connected to the loop shaft as shown.

The details of a self-orienting radio compass are disclosed in a copending application Serial No. 196,817, filed March 19, 1938, by Donald S. Bond and Wendell L. Carlson, entitled "Self-orienting radio direction finders." In Fig. 1 of said copending application, which is here produced in simplified form as Fig. 5, the output of the receiver 27 is preferably amplified by amplifiers 95, 97, 99 and is applied to a transformer 101. The transformer is connected to one field winding 103 of a two-phase motor 105. The second phase is applied to the motor field winding 107 by a connection to the audio oscillator 47. The motor is suitably connected to the directional antenna. The directional indication is obtained from scale 109 and pointer 111, of which the pointer may be driven by the motor 105.

In the instant application, audio oscillator 47 of Figs. 1 and 2 corresponds to the A.-C. generator of Fig. 5. The balanced modulator 57 and amplifier 53 of Fig. 3 are omitted and the amplifiers 95, 97 and 99 are substituted therefor. While there are advantages in using the self-orienting radio compass, the invention may be operated by simply applying the output of the balanced modulator 57 to the meter 32, as shown in Fig. 6. In this case, the balanced modulator rectifies the applied currents so that a direct current meter may be used. Furthermore, if the two-coil meter 31 of Fig. 2 is used, the balanced modulator 57 may be omitted and the left-right radio compass connection will be that of Fig. 2.

In the operation of the combined system the glide path may be determined directly in terms of field strength and may be indicated as the direct current component of the detector of the receiver, or by the amplitude of a suitable modulation component transmitted for this purpose. Instead of using the direct current or a separate modulation component, the indication may be had by averaging the two modulation components of the signals applied to the localizer fields 3, 5. The localizer detector A. V. C. circuit maintains a substantially constant input signal level to the discriminator portions of the circuit as described in the above mentioned copending application.

Thus the invention has been described as a receiver for an instrument landing system for aircraft. The receiver is arranged to indicate glide path, localizer signals, and radio compass signals. The output of receiver proper includes discriminating circuits which separate the several types of signals and apply these signals to the respective indicators.

I claim as my invention:

1. A radio receiver for an aircraft instrument landing system including a directional and a non-directional channel, means responsive only to signals from said non-directional channel for indicating the position of said receiver with respect to a glide path, means including said non-directional channel and responsive to signals distinguishable from said glide path signals for indicating the position of said receiver with respect to a localizer path, and means including said directional and said non-directional channels for indicating the direction of the source of said glide path.

2. A radio receiver for an aircraft instrument landing system including a directional and a non-directional channel, means responsive only to signals from said non-directional channel for indicating the position of said receiver with respect to a glide path, means including said non-directional channel and responsive to signals distinguishable from said glide path signals for indicating the position of said receiver with respect to a localizer path, and means including said directional and said non-directional channels for indicating the direction of the source of said localizer path.

3. A radio receiver for an aircraft instrument landing system including a directional and a non-directional channel, means responsive only to signals from said non-directional channel for indicating the position of said radio receiver with respect to a glide path, means including said non-directional channel and responsive to signals distinguishable from said glide path signals for indicating the position of said radio receiver with respect to a localizer path, and means including said directional and said non-directional channels for indicating the direction of the source of said glide path and localizer path.

4. A radio receiver for an aircraft instrument landing system including a loop antenna non-directively responsive to radio glide and localizer path signals, a dipole antenna directively responsive to radio glide path signals, means, including said loop antenna, responsive to signals defining a radio glide path for indicating the position of said radio receiver with respect to said path, means including said loop antenna for indicating the position of said radio receiver with respect to a runway localizer path, and means including said loop and said dipole antennas for indicating the direction of the radio waves establishing said glide path.

5. A device for indicating a landing path for aircraft including a non-directional antenna, means including said antenna responsive to signals defining a glide path of the equal field strength type to indicate said glide path, means responsive to signals defining a localizer path of the double modulation type, and means including a portion of said first named means and a directional antenna for indicating course departures to the left or right of a plane bisecting longitudinally said localizer path.

DONALD S. BOND.